United States Patent
Salomonsson

(10) Patent No.: US 9,921,053 B2
(45) Date of Patent: Mar. 20, 2018

(54) METHOD AND SENSOR FOR POSITIONING OF A FLEXIBLE ELEMENT

(71) Applicant: Niklas Salomonsson, Uppsala (SE)

(72) Inventor: Niklas Salomonsson, Uppsala (SE)

(73) Assignee: FEATHERWAY ROBOTICS AB, Uppsala (SE)

(*) Notice: Subject to any disclaimer, the term of this patent is extended or adjusted under 35 U.S.C. 154(b) by 98 days.

(21) Appl. No.: 14/907,890

(22) PCT Filed: Jul. 23, 2014

(86) PCT No.: PCT/SE2014/050903
§ 371 (c)(1),
(2) Date: Jan. 27, 2016

(87) PCT Pub. No.: WO2015/016765
PCT Pub. Date: Feb. 5, 2015

(65) Prior Publication Data
US 2016/0169663 A1    Jun. 16, 2016

(30) Foreign Application Priority Data

Jul. 29, 2013  (SE) ..................... 1350915

(51) Int. Cl.
*G01B 11/16*    (2006.01)
*G01D 5/353*    (2006.01)
(Continued)

(52) U.S. Cl.
CPC ............ *G01B 11/16* (2013.01); *B25J 18/06* (2013.01); *B25J 19/021* (2013.01); *G01D 5/268* (2013.01); *G01D 5/353* (2013.01)

(58) Field of Classification Search
CPC ........ G01B 11/16; G01D 5/353; G01D 5/268; B25J 19/021; B25J 18/06
(Continued)

(56) References Cited

U.S. PATENT DOCUMENTS 4,727,247 A * 2/1988 Johnston .............. G01B 11/02
250/227.23
5,026,141 A  6/1991 Griffiths
(Continued)

FOREIGN PATENT DOCUMENTS

DE           40 02 293 A1   8/1991
DE   10 2006 048 635 A1   4/2008
(Continued)

OTHER PUBLICATIONS

G. Chen et al., "Sensor-based guidance control of a continuum robot for a semi-autonomous colonoscopy", Robotics and Autonomus Systems, 2009, vol. 57, pp. 712-722.
(Continued)

*Primary Examiner* — Jaime Figueroa
(74) *Attorney, Agent, or Firm* — Young & Thompson

(57) ABSTRACT

Sensor for enabling positioning of a flexible element subject to applied forces, the sensor includes at least two spatially separated light permeable tubes, 10 each having a first end 1*a*, 10*a* arranged on a first frame portion 11*a* and a second end 1*b*, 10*b* arranged on a second frame portion 11*b* of the flexible element. Each of the light permeable tubes in the sensor includes a light detecting device 3, that is connectable to a processing unit 4, and arranged at a light detecting position of each of the light permeable tubes and configured to detect light emitted from a light emitting source 2 through each 10 of the at least two light permeable tubes 1, 10 and configured to transfer information including information relating to the detected light to the processing unit 4.

30 Claims, 12 Drawing Sheets

(51) Int. Cl.
G01D 5/26 (2006.01)
B25J 18/06 (2006.01)
B25J 19/02 (2006.01)

(58) Field of Classification Search
USPC .................. 700/245, 258; 606/130, 229, 230
See application file for complete search history.

(56) References Cited

U.S. PATENT DOCUMENTS

| | | | | |
|---|---|---|---|---|
| 5,633,494 | A * | 5/1997 | Danisch | G02B 6/02057 250/227.14 |
| 5,818,982 | A * | 10/1998 | Voss | G01D 5/35345 385/13 |
| 6,389,187 | B1 * | 5/2002 | Greenaway | G01M 11/083 385/13 |
| 6,471,710 | B1 * | 10/2002 | Bucholtz | G01B 11/18 600/229 |
| 2002/0128783 | A1 | 9/2002 | Marcu et al. | |
| 2006/0045408 | A1 | 3/2006 | Jones et al. | |
| 2007/0116415 | A1 | 5/2007 | Kobayashi | |
| 2007/0156019 | A1 * | 7/2007 | Larkin | B25J 19/025 600/104 |
| 2011/0292049 | A1 * | 12/2011 | Muravsky | G06F 3/0362 345/440 |
| 2012/0035437 | A1 * | 2/2012 | Ferren | A61B 1/041 600/302 |
| 2015/0141768 | A1 * | 5/2015 | Yu | A61B 5/0084 600/301 |

FOREIGN PATENT DOCUMENTS

| | | |
|---|---|---|
| EP | 1 635 034 A1 | 3/2006 |
| WO | 94/29671 A1 | 12/1994 |
| WO | 01/13060 A1 | 2/2001 |

OTHER PUBLICATIONS

J.M. Croom et al., "Visual Sensing of Continuum Robot Shape Using Self-Organizing Maps", IEEE International Conference on Robotics and Automation, 2010, pp. 4591-4596.
Cruz et al., "Modeling Two Classes of Stewart-Gough Platforms", Institute for Systems and Robotics, pp. 1-8.
Kesner et al., "Multifiber optical bend sensor to aid colonoscope navigation", Optical Engineering, vol. 50(12), 124402, Dec. 2011.
Lobaton et al., "Continuous Shape Estimation of Continuum Robots Using X-ray Images", IEEE International Conference on Robotics and Automation (ICRA), 2013, pp. 725-732.
Xu et al., "An Investigation of the Intrinsic Force Sensing Capabilities of Continuum Robots", IEEE Transactions on Robotics (TRO), vol. 23, No. 3, pp. 576-587.
Zawawi et al., "Compensated Intensity-Modulated Optical Fibre Bending Sensor based on Tilt Angle Loss Measurement", IEEE, 2014, pp. 1-4.
International Search Report, dated Nov. 28, 2014, from corresponding PCT application.
Supplementary European Search Report issued in Application No. 14832200.1, dated Feb. 22, 2017.

* cited by examiner

US 9,921,053 B2

METHOD AND SENSOR FOR POSITIONING OF A FLEXIBLE ELEMENT

TECHNICAL FIELD

The present technology relates in general to a method and a sensor that enables the positioning of a flexible element that are subject to applied forces and torques. More particular it relates to a method and a sensor that utilizes optics to enable the positioning of a flexible element such as a robotic limb.

BACKGROUND

One of the problems in traditional robotics is that the limbs of a robot must be bend resistant so that the position of the end effector can be positioned by summing the vectors from each axis rotation point. To make the limbs bend resistant the most common approach is to manufacture them out of metal. This results in excessively heavy robots that demand a high amount of power during operation. In mobile robotics this renders a relatively low battery time which in turn limits the capabilities of the robot. The weight of the robot limbs can be reduced by introducing more light weighted materials such as carbon fiber, which has a high strength to weight ratio. This on the other hand has the downside that the limbs will be prone to bending. This proposal therefore results in decreased energy demands but also a decrease in precision. Many different methods have been proposed to model robots with bending limbs, also referred to as continuum robots, all resulting in more or less precise 3D positioning results depending on what sensor data is used. Sensors used in continuum robotic limbs make use of force sensors attached to varying parts of the robot (Ref 1). X-Rays and other visual systems have also been used in shape estimation see e.g. (Ref. 2) and (Ref. 3). Positioning using optical fibers have been proposed where three pairs of optical fibers are attached on the robot. Light is emitted through one of the fibers in each pair. The light is directed out from the robots body towards the surrounding walls. The intensity of the light that bounces back from the walls is measured through the other optical fiber in the pair. By a priori knowledge of the surrounding walls the information from the intensity measurements can be used to make a positioning of the robot see (Ref. 4). Such a measurement procedure is however inherently dependent upon the background and will significantly reduce the possible environments where the robot can be successfully used.

The bend of a flexible robotic limb can be determined using bend resistors, where the resistor is fastened on the limbs. Bend resistors exists today in the form of resistive sensors that change the resistance of the device when bent. The resistance is proportional to the bend and can thus be used to estimate the bend of the sensor or the force that is applied to the sensor if other specifications of the sensor are given. One example of this is the Tactilus® Flex by SENSOR PRODUCTS INC. One approach of estimating the bend in a structure element using at least three strain sensors positioned around the structure is disclosed in Ref. 5. The lengthening and shortening of the structure at a specific position where a strain sensor is present can be measured. By using multiple strain sensors the bend of the structure can be estimated. This approach utilizes Bragg-gratings to obtain the estimate.

In Ref 6, there is proposed a sensor for determining the bend of a number of optical fibers bundled together. The optical fibers form part of a colonoscopy camera and are provided with holes on their surface. A measurement of the intensity of light emitted through the optical fibers is compared to an initial intensity level. If the fibers are bent a certain amount of light will escape through the holes and thus leading to a difference in detected intensity contra the emitted intensity. The fact that the optical fibers are bundled together will however negatively affect the precision of the measurements needed to be able to determine the position of a flexible large body subject to substantial forces and torques.

Multi-tubular continuum robotic limbs have been used in robotic applications where weight and material use may be an issue. Generally, the tubes are fastened in solid sectional dividing frames. A multi sectional approach can be used where each sectional divider can be considered a frame. Estimation of the dynamic transformation of each pair of bases is done using modeling in combination with sensor readings and a priori knowledge of external forces. From the dynamic transformation and information about the tubular structure 3D positioning of the end effector and other parts can be made. This proposal however relies upon the a priori knowledge of the applied forces and are therefore somewhat lacking in respect of the precision that is needed to obtain an accurate positioning of robotic limbs.

It is a purpose of the proposed technology to provide alternative methods and apparatuses for the positioning a flexible element such as a robotic limb. This technology aims to at least alleviate the problems within the technical field and at the same time provide accurate positioning of extended flexible elements subject to forces and torques.

SUMMARY

It is a general purpose to provide a method and a sensor that overcomes some of the problems with the prior art attempts for enabling the positioning of a flexible element subject to applied forces and torques.

According to a first aspect there is provided a method for enabling the positioning of a flexible element comprising at least two spatially separated light permeable tubes provided with first end portions and second end portions attached to corresponding frame portions. The method comprises the steps of, emitting light through a first end of each of the at least two light permeable tubes and detecting the light having propagated through the at least two light permeable tubes at a specific light detecting position for each of said at least two light permeable tubes and processing characteristics of the light detected at the specific light detecting positions for each of said light permeable tubes to determine the bend of each of said light permeable tubes. This method provides for an efficient and reliable way to obtain a positioning of a robotic limb where a number of independently detected light characteristics are used to determine the bend of each of the light permeable tubes. These bends are then used, by means of further steps, to extract the position of the frame portions relative their initial position.

According to a second aspect there is provided a sensor for enabling positioning of a flexible element, the sensor comprises at least two spatially separated light permeable tubes with a first end, arranged on a first frame portion, and a second end arranged on a second frame portion of said robotic limb. Each of said at least two light permeable tubes comprises a light detecting device arranged at a light detecting position of each of said light permeable tubes and configured to detect light emitted from a light emitting source through said at least two light permeable tubes and a processing unit connectable to said light detecting device and configured to determine a degree of bending of each of the at least two light permeable tubes based on characteristics of the light detected by the light detecting device. This sensor will provide accurate positioning of the flexible element while at the same time being both robust and insensitive for the influence of the background where it is used.

More detailed descriptions of the above mentioned advantages and embodiments as well as others will be given in the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
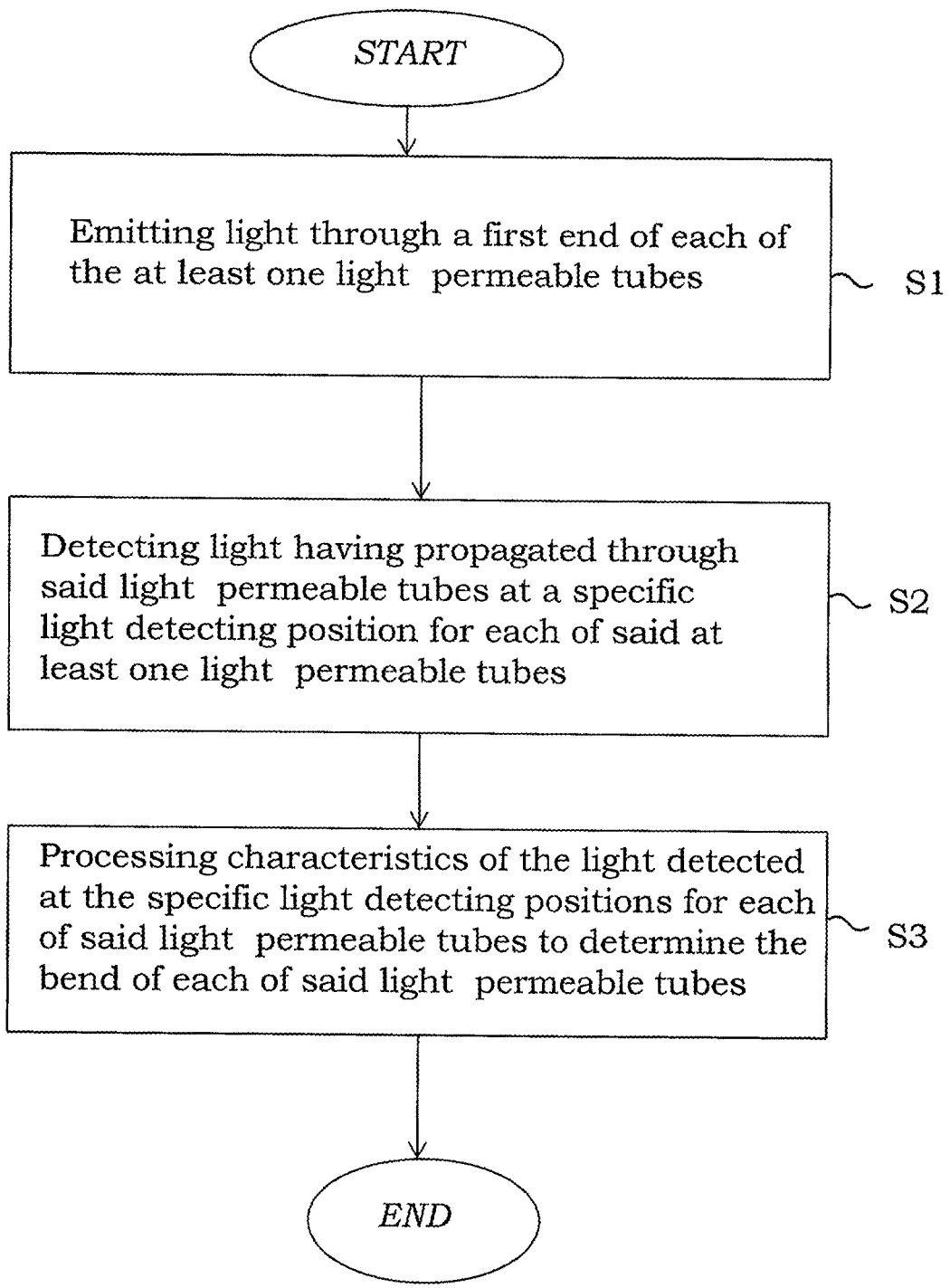
FIG. 1 is a schematic flow diagram showing an exemplary embodiment of the method according to the present disclosure.

Throughout the drawings, the same reference numbers are used for similar or corresponding elements.

The proposed technology relates to methods and sensors for providing a highly accurate positioning of an element such as a robotic limb. The technology is particularly useful when the element is a flexible one such as a flexible robotic limb, that is, a limb that is constructed in such a way as to allow it to flex or bend when subject to applied forces. When forces are applied to the flexible robotic limb, the limb will bend which will alter its position relative the initial position. To provide for an automation of a robotic limb by means of, for example, feed-back steering of the robotic limb, it is of utmost importance to have a reliable positioning system even in those cases where the robotic limb is allowed to bend due to applied forces and torques.

Before dealing with the details of the proposed technology, we state in broad terms the proposed way for positioning of a flexible element such as a robotic limb. The positioning relies on the features of a new sensor design. The sensor design makes use of certain optical characteristics of light to provide a measure of the forces and torques that are applied to the sensor.

To this end the sensor is provided with a number of spatially separated light permeable tubes whose end portions are attached to first and second frame portions, respectively. During regular use of the sensor, forces will either be applied directly on the frame portions or applied indirectly on the frame portions in those cases when the frame portions are embedded in an outer structure. The applied forces will have the effect that the light permeable tubes attached to the frame portions will be bent if the initial configuration was straight or stretched if the initial configuration was bent. To provide for a positioning of the flexible element/robotic limb even after applied forces the sensor has to be able to determine the bend of the tubes. To achieve this purpose light is used. That is, light from a light source is emitted into each of the light permeable tubes through a first end of the tube. This light is allowed to propagate in the tubes all the way to a light detection position. In this light detection position the light is detected and certain characteristics, such as light intensity, is extracted. The extracted light characteristics are then processed to obtain a measure of the bend of each of the light permeable tubes. Since light propagates and is detected in all of the individual tubes and since these tubes are spatially separated and thus independently bent one obtain a high quality measure of the bend of each individual tube. Once the bends of the individual tubes has been determined, further method steps, to be described in detail in what follows, are used to obtain a positioning of the frame portions relative their initial positions.

In a slightly more detailed exposure, the necessary measurements providing the possibility to position a flexible element such as a robotic limb can be obtained by providing a common light emitting source for all light permeable tubes or by providing each single light permeable tube with a light emitting diode, LED, or some other light emitting source. The light emitting source(s) is configured to emit light into each tube. To power the light emitting sources one might connect them to some voltage source, such as a battery, and suitable resistors. Now while the light emitting source(s) emits light through the tube(s) each of the light permeable tubes in the sensor is also provided with light detectors that is configured to measures the light intensity in some other chosen position of the tube(s). These light detecting devices could, for example, be photo diodes or photo transistors, and they are configured to detect the amount of photons that reaches the detectors which will provide an estimate of the intensity of the light at the position of the light detectors. The amount or number of photons that reaches the detector in a single tube is dependent on the bend of the tube as the tube, when bent, will absorb some of the photons hitting the inner surface. Generally, the higher the bend the higher the absorption of the tubes surface will be, and it is therefore possible to estimate the bending degree of the tube(s) by using information about the tubes inner surface, the strength of the light emitting source and the light detector's reading. A more mathematical exposure of how this is obtained is given in section 1 in the appendix.

Having described the technology in broad terms above we will now continue to describe various detailed embodiments of the technology.

With reference to FIG. 1, in one exemplary embodiment of the present invention there is disclosed a method that enables the positioning of a robotic limb. The flexible element, which could be a robotic limb, comprises at least two spatially separated light permeable tubes 1, 10 provided with first end portions 1a and second end portions 1b attached to corresponding frame portions 11a, 11b. The method comprises the steps of:
  i) emitting S1 light through a first end of each of the at least two light permeable tubes;
  ii) detecting S2 light having propagated through said light permeable tubes at a specific light detecting position for each of the at least two light permeable tubes;
  iii) processing S3 characteristics of the light detected at the specific light detecting positions for each of the light permeable tubes to determine the bend of each of said light permeable tubes.

These steps, when performed, will provide a measure of the bend of each of the light permeable tubes. The number of tubes used carries some significance, for example, to obtain a two dimensional representation of the position one needs at least two spatially separated light permeable tubes, a three dimensional representation of the position will in turn take three spatially separated light permeable tubes. It is however possible to use a large number of light permeable tubes if one is interested in providing more detailed information about the positioning. The method steps as described above provide an efficient way to determine the position a flexible element such as a robotic limb comprising the features of multiple spatially separated light permeable tubes. The method can be applied in most environments since it is robust and shielded against influence from the background, i.e. when a robot works in a highly illuminated area.

Figure 2:
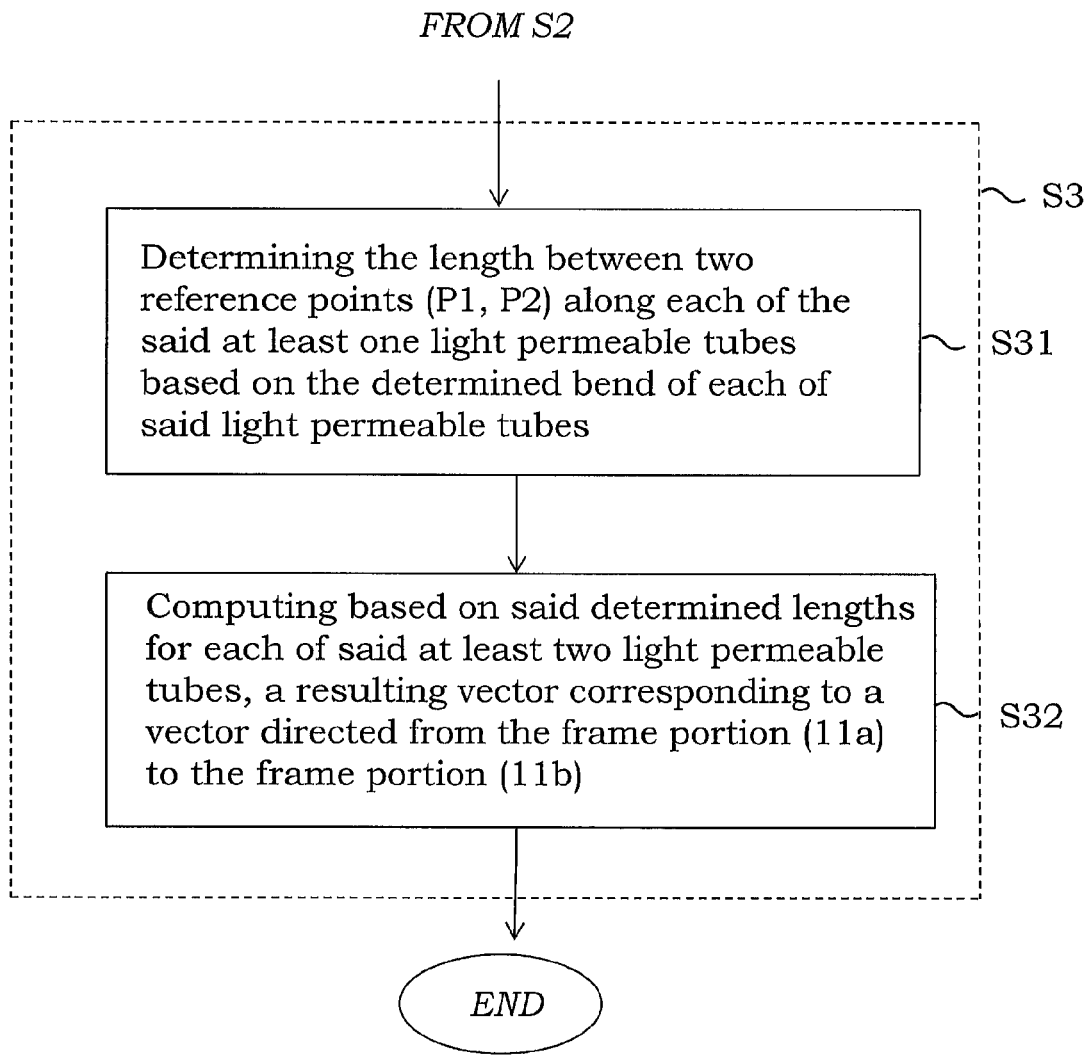
FIG. 2 is a schematic flow diagram showing an alternative exemplary embodiment of the present disclosure.
Figure 3:
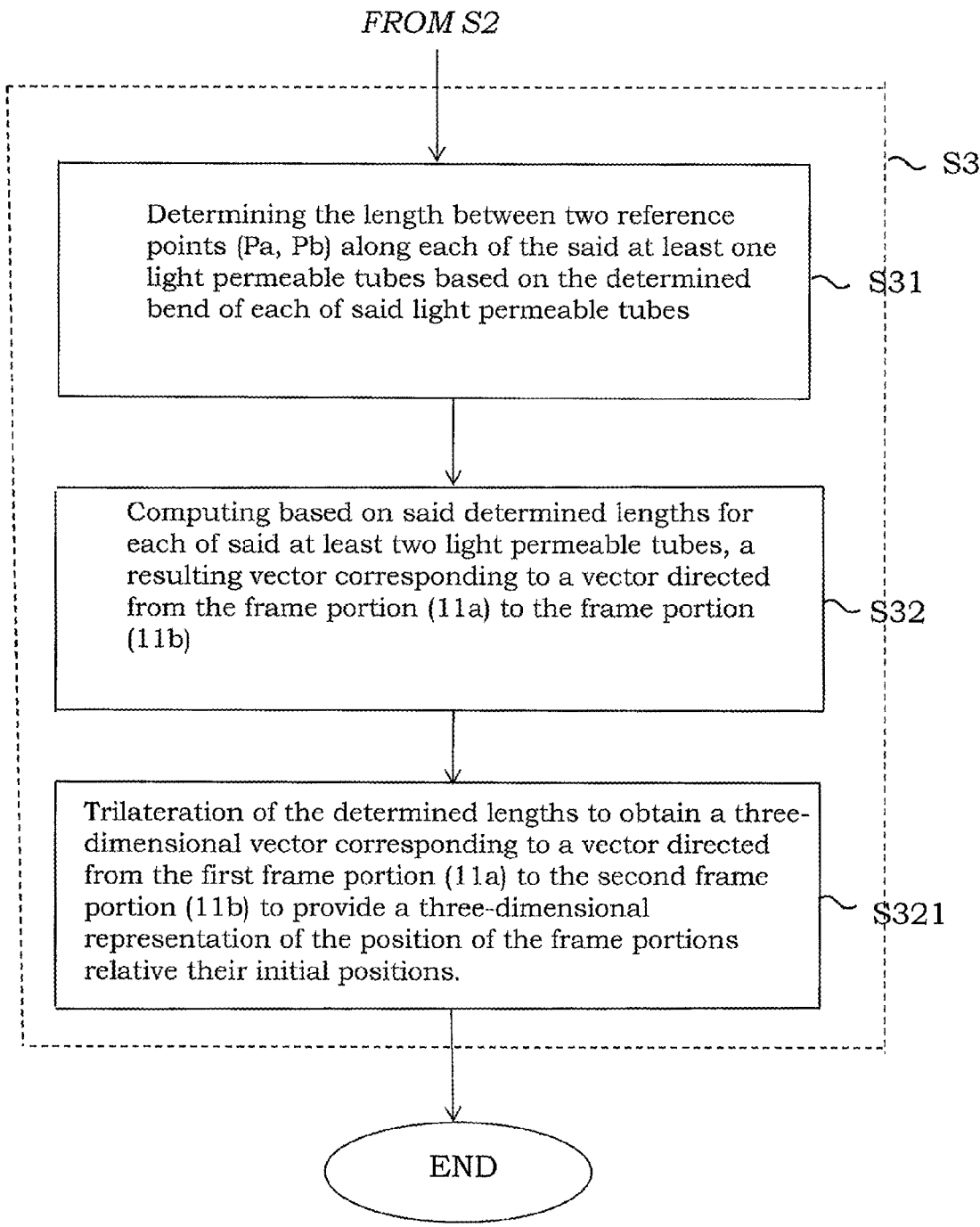
FIG. 3 is a schematic flow diagram showing yet another alternative exemplary embodiment of the present disclosure.

As can be inferred from FIG. 2, in an exemplary embodiment of the method, the step of processing S3 comprises the step of determining S31 the length between two reference points Pa and Pb along each of the said at least two light permeable tubes based on the determined bend of each of the light permeable tubes. This method step uses the determined bend on each of the light permeable tubes to calculate a corresponding length measure for each of the light permeable tubes. These length measures will be used in a step S32 to compute a resulting vector corresponding to a vector directed from the frame portion 11a to the frame portion 11b. In the particular case that there are two light permeable tubes, this computed vector will provide a two-dimensional representation of the position of the frame portions relative each other. In the case that there are three light permeable tubes this computed resultant vector will instead provide a three-dimensional representation of the position of said frame portions relative each other, this method steps is illustrated in FIG. 3. The general computation in the three dimensional case is usually referred to as trilateration, examples of the computational details for both the two dimensional and three dimensional case are given in section 2 in the appendix. The mathematical details for converting the determined lengths to vectors representing the positions of the frame portions might differ with regard to, for example, chosen coordinate systems and alike and the details in the appendix are only given to enable a skilled artisan to implement the method. Various other schemes of computing can be foreseen without departing from the scope of the proposed technology.

Certain light characteristics are extracted from the detected light to determine the bend of the light permeable tubes, in a preferred embodiment the specific characteristics comprises the light intensity.

The proposed technology also relates to a sensor that enables the positioning of, for example, a robotic limb. The sensor as such can however be used in other applications where a positioning of certain elements subject to forces and torques are requested. The features of the sensor do not depend on the specific application. It is rather a device that provides highly accurate positioning of dynamically changing flexible elements and can thus find a multitude of applications beyond the realm of robotics. In this description it will however be used in relation to the positioning of a robotic limb.

Figure 4A:
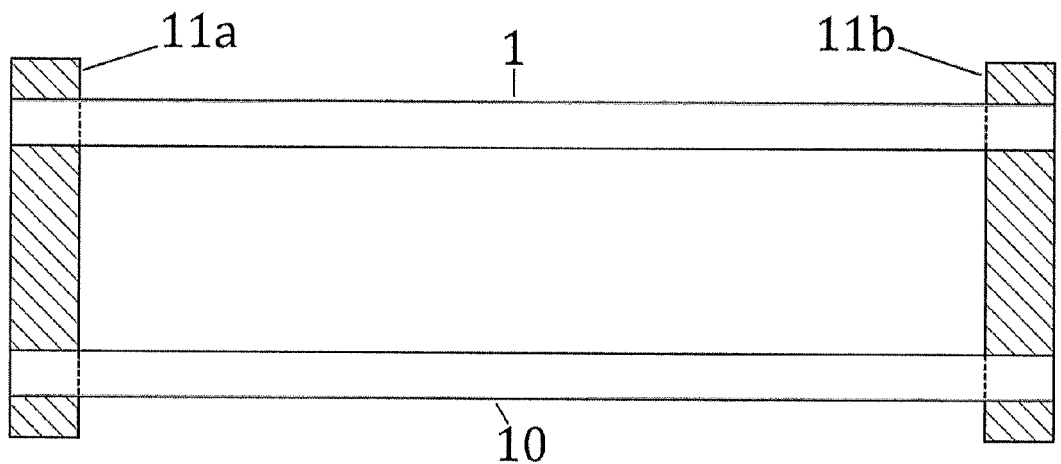
FIG. 4a shows an alternative embodiment of a sensor according to the present disclosure. The figure illustrates the tube structure for the sensor when said sensor comprises two light permeable tubes.
Figure 4B:
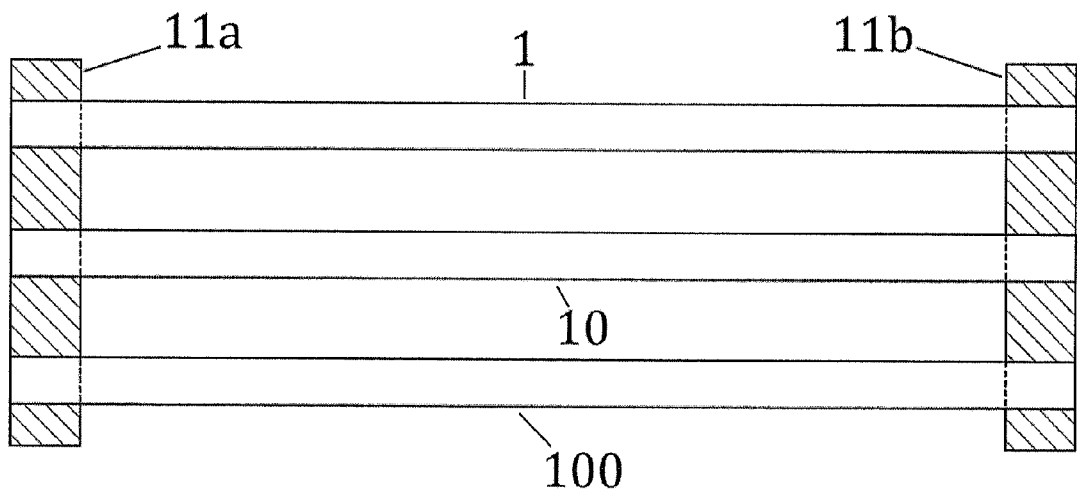
FIG. 4B shows an alternative embodiment of a sensor according to the present disclosure. The figure illustrates the tube structure for the sensor when said sensor comprises three light permeable tubes

In FIGS. 4a and 4b there is schematically shown the structure of the light permeable tubes comprised in a sensor according to the present disclosure. In FIG. 4a there is shown how the end portions of two light permeable tubes 1, 10 are attached to frame portions 11a and 11b. In FIG. 4b there is instead illustrated how three different spatially separated light permeable tubes 1, 10, 100 are attached to the frame portions 11a and 11b.

Figure 5:
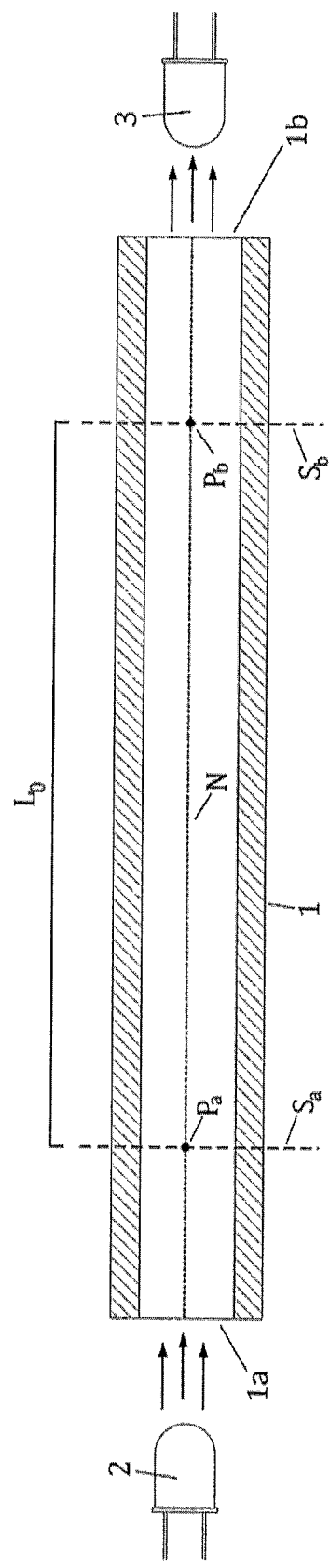
FIG. 5 shows a side view of an exemplary embodiment of a sensor according to the present disclosure where a single tube of the sensor is shown in an unbent configuration.
Figure 6:
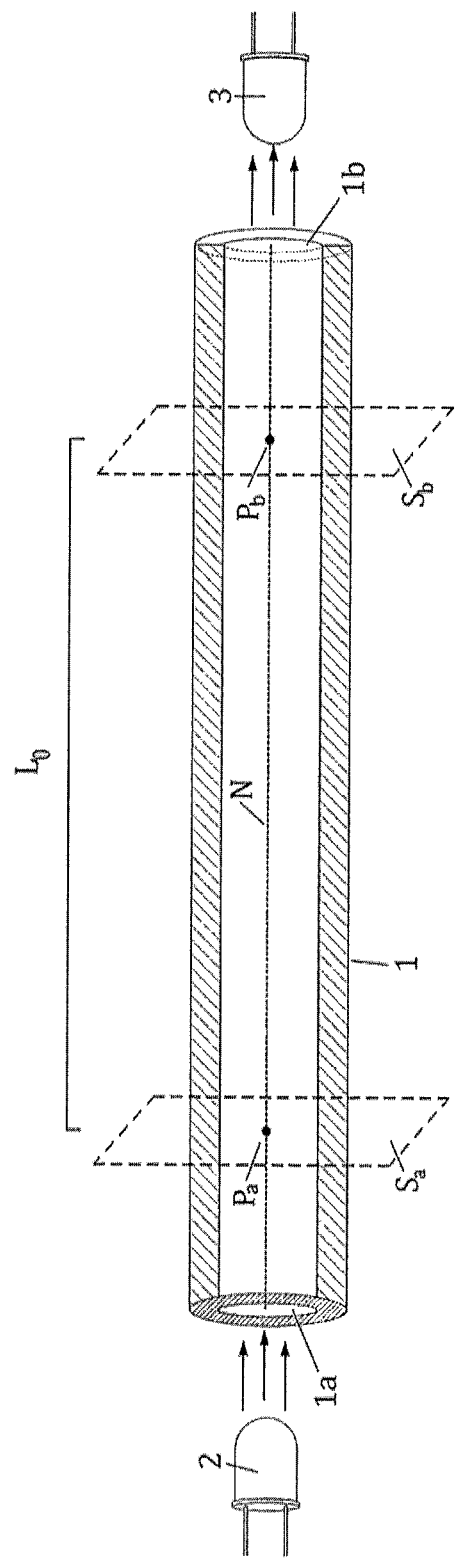
FIG. 6 shows an exemplary embodiment of a sensor according to the present disclosure in a different view, a single tube of the sensor is shown in an unbent configuration

With reference to FIG. 5, or given in an alternative view in FIG. 6, there is shown an example of an embodiment of the proposed sensor that enables a positioning of a robotic limb comprising said sensor. To obtain clarity and to facilitate the understanding of the technology is a single tube illustrated in the drawing. The sensor comprises however at least two spatially separated light permeable tubes 1, 10 having a first end 1a, 10a arranged on a first frame portion 11a and a second end 1b, 10b arranged on a second frame portion 11b of said robotic limb. The sensor also comprises a light detecting device 3, that can be connected to a processing unit 4 and that is arranged at a light detecting position of each of the light permeable tubes and that is configured to detect light emitted from a light emitting source 2 through the at least two light permeable tubes 1, 10 and also configured to transfer information comprising information relating to characteristics of the detected light to said processing unit 4.

Figure 9:
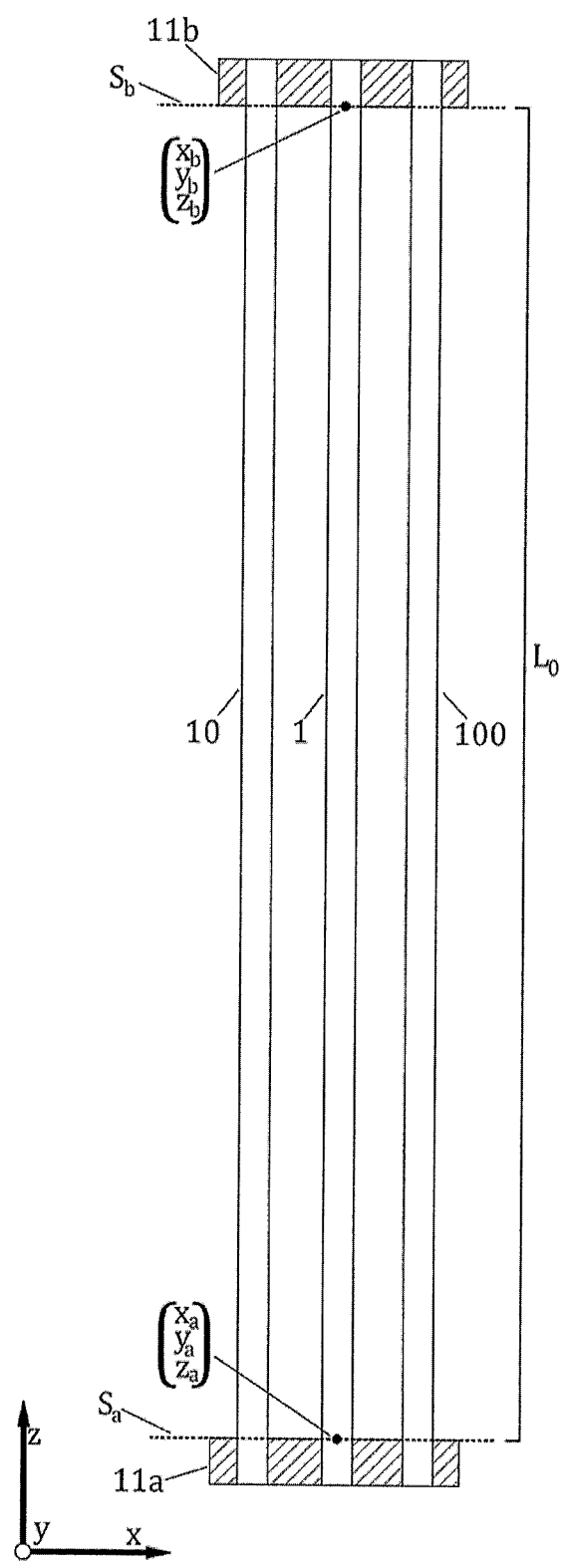
FIG. 9 shows an alternative exemplary embodiment of a sensor according to the present disclosure, here three tubes of the sensor are shown in an unbent configuration.

In FIG. 9 is shown the light permeable tube structure of a sensor as given above but provided with three light permeable tubes denoted 1, 10, 100, respectively.

With the term spatially separated above is meant that the light permeable tubes are uncoupled, that is, not bound to each other over at least large parts of their lengths. This is to ascertain that the result of measurements relating to a specific tube is independent of the result of the measurement of other tubes. In other words, each light permeable tube provides for an independent degree of freedom when it comes to measurements and will as such provide unique information that can be processed to enable the positioning of a flexible element such as a robotic limb.

The frame portions 11a and 11b that constitutes the bases on which the light permeable tubes are attached are also the structures where the forces are applied. Directly on the frame portions for those cases where the sensor is free and indirectly when the sensor is embedded in an outer structure such as a flexible element, i.e. a robotic limb. In the latter case the applied force will be transferred on to the frame portion via the outer structure and should therefore be attached to the flexible element in a way that transfers the force as easy as possible. The sensor utilizes light permeable tubes. With the term light permeable tube is intended tubes whose interior allows light to propagate more or less freely. These tubes could, for example, be hollow tubes but they may also be more elaborate constructions such as optical fibers. The important feature of the tubes is however that they should allow light to propagate largely undisturbed within its interior. The tubes are preferably made of a flexible material, and they could be made out of light weighted carbon fibers or optical fibers being strengthened by an outer layer of a light-weight material such as carbon fiber. In yet another exemplary embodiment the tubes could be provided with electrically conducting means that allows current to be fed between the frame portions. They could also be partially provided with such means to provide for the possibility that current can be conducted along at least parts of the surface of the tubes. Examples of such means are electrically conducting stripes or electrically conducting material embedded in the material of the outer layer of the tubes. The purpose of such an embodiment is that it provides a way to utilize a sensor within, for example, a robotic limb as both a sensor and as a current conductor. In this way the amount of wires and cables carrying currents can be reduced. This provides for the possibility of a more light-weighted robotic limb.

The light emitting source 2, which could be a regular light emitting diode, could either be provided externally from the sensor or it could be integrated into the sensor. In the case where it is arranged externally from the sensor it should be arranged on an outer element so that it can emit light into the light permeable tubes 1. Such an outer element could for example be the main robot body if the sensor is either incorporated in a robotic limb or if the sensor with its frame portions constitutes a robotic limb. All of the light permeable tubes could be provided with their own light emitting source dedicated to emit light through their allocated light permeable tube. It could however also be a single light emitting source allocated to multiple light permeable tubes.

A possible feature that might be implemented in light emitting source is to provide it with a pulse transmitting feature. By transmitting light in pulses, or blinking, binary information can be sent through the tube one way, in the direction from the light emitting source to the light detecting device. For example, by exchanging the position of the light emitting source and the light detecting device on one or more tubes one obtains the possibility to transmit information in a bidirectional fashion. This might find uses if one would like to reduce the number of information carriers in a structure incorporating the sensor. Such structures could for example be a robot carrying a robotic limb with a sensor according to the present disclosure.

The light detecting device 3 of every light permeable tube 1 is provided somewhere along the length of the light permeable tube 1. In one embodiment it is provided on the second end 1*b* of the light permeable tube 1. By placing it there it is easy for an operator to reach it which makes it easier to replace the light detecting device if it is broken. In another embodiment is the light detecting position provided somewhere along the length of the tube closer to frame portion 11*b* than frame portion 11*a* in the case that the light emitting source is provided at frame portion 11*a*. In still another embodiment is the light detecting position provided in near proximity to the light emitting device. In this embodiment is the light permeable tube 1 provided with a mirror that reflects the emitted light that have propagated through the light permeable tube 1 back towards the light detecting device 3. This might also be preferred for repair and replacement considerations. The mirror could in this case be provided at the second end 1*b* of the light permeable tube if the light emitting source is provided at the first end 1*a* of the light permeable tube. The mirror could also be provided within the tubes at particular positions as described above in relation to the light detecting position. As can be seen is there a multitude of choices of where to position the light detecting device along the light permeable tubes. The common feature of all the possible positions is that they should be chosen so that the detected light has been able to propagate at least partially over the lengths of the light permeable tubes.

Figure 12:
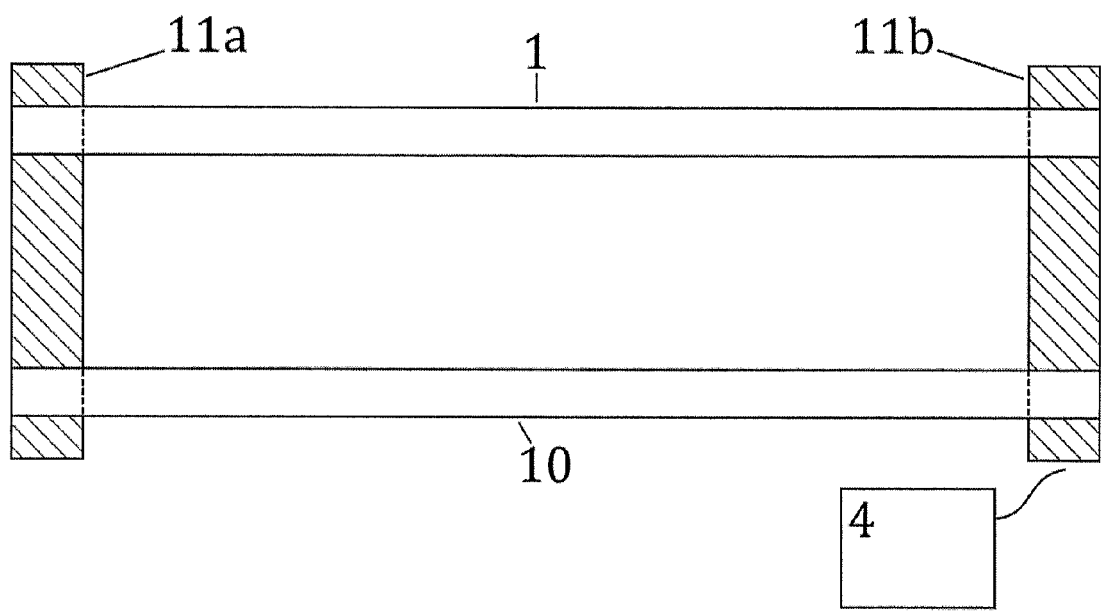
FIG. 12 illustrates schematically an alternative embodiment wherein the sensor is connected to an external processing unit.

The sensor is in another exemplary embodiment provided with a processing unit 4 that is connected to the light detecting device, see e.g. FIG. 12. In still another embodiment is the processing unit 4 integrated with the sensor. That is, it forms part of the sensor. The processing unit 4 is, as earlier, configured to determine the bend of each of the at least two tubes in the sensor based on characteristics of the detected light. The processing unit thus takes as input information comprising information regarding light characteristics such as intensity and based on the input it determines the bend of the sensor. A possible algorithm for achieving this is provided in section 2 in the appendix.

In one exemplary embodiment is the processing unit 4, in both the case where it is integrated in the sensor or externally provided but connectable to the sensor, also provided with a determining unit 41. The determining unit 41 is configured to determine the length between two reference points along each of the said at least two light permeable tubes based on the determined bend of each of said light permeable tubes. Here two reference points, Pa and Pb, on each of the tubes used in the sensor are chosen in advance. Based on the determined bend of the different tubes the determining unit 41 is configured to determine the length between these points. With lengths is here intended the Euclidean distance or the straight line connecting said points, see e.g. the length L given in FIG. 8. Stated slightly more briefly, the determining unit 41 takes as input the measures of bends of the tubes and determine the lengths between the selected points Pa and Pb of each of the light permeable tubes used in the sensor. To achieve a simple algorithm for computations it is preferred if the point Pa are centrally located within light permeable tube 1, 10 and are arranged at a location where the end portion 1*a*, 10*a* of the light permeable tube approximately connects to the frame portion 11*a*. Correspondingly the point Pb should be chosen to be centrally located within the light permeable tube 1, 10 and located at a position along the tube that is approximately the position where the end portion 1*b*, 10*b* connects with the frame portion 11*b*. Other locations of the points Pa and Pb are however possible at the cost of computational complexity. The appendix provides an exemplary algorithm that can be used for this length determining step.

In still another exemplary embodiment of a sensor according to the proposed technology is the processing unit further provided with a computing unit 42. The computing unit 42 is configured to compute, based on the determined lengths for each of said at least two light permeable tubes, a resulting vector corresponding to a vector directed from the frame portion 11*a* to the frame portion 11*b*. This unit therefore generates a vector that extends between the frame portions 11*a* and 11*b*. Based on this vector it is possible to obtain a two- or three-dimensional representation of the positions of said frame portions 11*a*, 11*b* relative their initial positions.

The two-dimensional case above can be obtain by detecting light propagating in two spatially separated light permeable tubes while the three-dimensional case can be obtained by detecting light propagating through three spatially separated light permeable tubes.

An exemplary algorithm for obtaining the two- and three-dimensional representations of the positions of the frame portions can be found in the appendix of the present application.

One particular embodiment of a sensor that enables the positioning of a flexible element such as a robotic limb comprises light permeable tubes whose inside of said light permeable tubes is prepared to reduce reflections within, and obtain an even absorption along, the light permeable tubes. This might be done to counter the fact that some levels of bend might result in intensity spikes due to mirroring effects along the inner surface(s) of the tube(s) or that the bend estimation is dependent on the direction of the bend as a result of an uneven absorption in the tube. By processing the inner surface of the tube, by for example coating the surface with a coating or sanding it, so that the walls mostly reflects diffuse light the mirroring effects can be reduced making the bend estimation more precise. Another possible way to reduce the direct reflectivity is to provide the inside surface of the tube with soot. It is preferred if the chosen measure to reduce direct reflection does not lead to light polarization changing effects. In several embodiments of the sensor, embodiments that will be described below, is it preferable if the polarization of light stays constant during interactions between the light and the material of the light permeable tubes. It might be also be an advantage for computational reasons if the inner surface of the tube is more or less homogeneous. If the processing is made in a way that utilizes coatings or other materials so that the inner surface becomes homogenous and isotropic it is also possible to make the bend estimation for any particular direction by using only information on the relationship between bend and intensity readings for a single chosen direction. One possible way to obtain the features according to above is to sand the inner surface of the light permeable tubes and/or coat it with a silver paint.

A sensor as described above provides for an efficient way to position a frame portion of a flexible element when the positions of the elements have been altered by externally applied forces. In certain applications however there might also be preferred if one could provide a sensor that was able to yield a measure of an eventual twist or torsion of the frame portions and the corresponding light permeable tubes. The present sensor provides for such a feature through an alternative design where the sensor also comprises means for detecting the polarization of the light propagating through the light permeable tubes. Generally stated, the functionality of this particular embodiment relies on having a first polarization of the light emitted from the light emitter, and then providing a light polarization means, such as a polarization filter, having a different polarization direction than the incoming light, on a location in the tubes somewhere between the light inlet and the light detecting position. By providing a polarization means between these positions it will be possible to compare the detected intensity with the intensity of the incoming light. This particular feature will be described in more detail below.

In a first embodiment of a sensor provided with polarization means at least one of the light permeable tubes are provided with a single polarization means 112, such as a polarization filter, arranged at a polarization location. This polarization location is placed somewhere in the light permeable tube between the light emitting source and the light detection position. It could also be positioned at the light detecting position and be part of the light detecting device, for example in the form of a polarization filter arranged in a photo diode or a photo transistor. The polarization means 112 could also be an integrated feature of the photo detecting device, that is a photo diode or phototransistor that detects light of a particular polarization. This embodiment is possible if the incoming light was emitted from the light source with a specified polarization, i.e. linearly polarized light. It is possible to provide all or several of the light permeable tubes with such polarization means to thereby obtain several measures of the twist or the applied torque. It is however also possible to provide a single one of the light permeable tubes with this feature. In this case the measurement of light having propagated through a single light permeable tube is used to determine the twist of applied torque.

In another embodiment is the sensor provided with first 111 and second polarization 112 means. The first polarization means 111 is provided along the tube at a position after the light emitting device and the polarization means 111 might be a polarization filter. The purpose of this first polarization means 111 is to polarize the incoming light in a particular way, for example give the light a linear polarization. The second polarization means 112, that might be a polarization filter, is provided somewhere between the first polarization means 111 and the light detecting position. The second means is arranged to give the light a different polarization than the initially provided, it might for example provide a 45 degree polarization, other polarization are however possible. The purpose of this is to detect light characteristics such as intensity to provide a way to determine possible twists of the light permeable tubes or the corresponding torques responsible for the twists. For example, if the first means provide a linear polarized light and the second means provide light having a 45 degree polarization relative the first initial polarization, than the light detecting device 3 will record an intensity maxima if the tube has been twisted 45 degrees in such a way that the first initial polarization coincides with the second polarization. By making several measurements one can compare the direction of the twist or torque with a plot showing how the detected intensity changes with the direction of the plot. Such a plot can be obtained experimentally by altering the applied torque and detecting the intensity. As stated above, several or all of the light permeable tubes could be provided with these first and second light polarization means. It is however also possible to provide a single one of the light permeable tubes with this feature. In this case the measurement of light having propagated through a single light permeable tube is used to determine the twist of applied torque.

Put slightly different, in one exemplary embodiment, the proposed technology provides for a sensor wherein at least one of the light permeable tubes comprises second polarization means 112 for giving light a polarization different from the polarization of the emitted light, said second polarization means 112 being arranged at a position along the tube between the light emitting source 2 and the light detection position.

In still another embodiment, the proposed technology also provides a sensor wherein at least one of the light permeable tubes comprises first polarization means 111 for giving light a first polarization, said means being arranged at the first open end 1*a*, and second polarization means 112 for giving light a second polarization, different from the first polarization, where said second means 112 are arranged at a position along the light permeable tubes 1, 10 between the first polarization means 111 and the light detection position.

Figure 11:
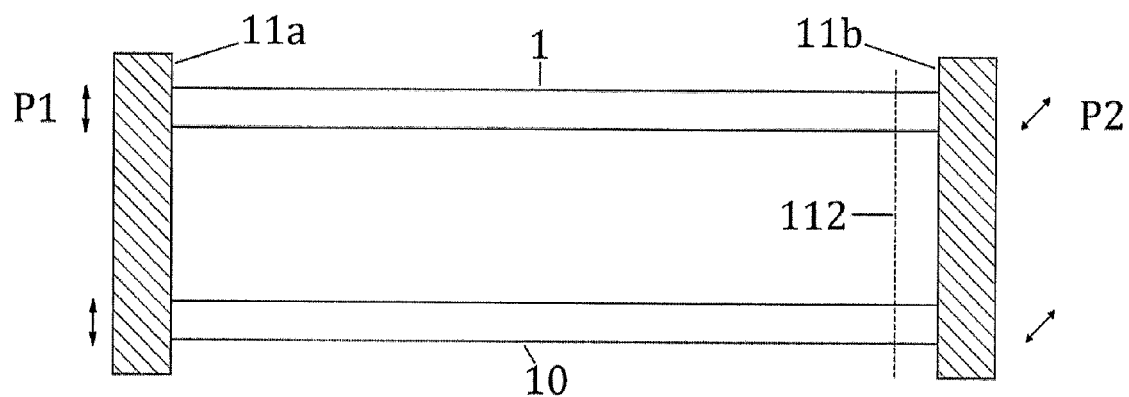
FIG. 11a illustrates schematically an exemplary embodiment of a sensor according to the present disclosure.
FIG. 11b illustrates schematically an alternative embodiment to the embodiment illustrated in FIG. 10b.

In FIG. 11*a*, there is illustrated an exemplary and illustrating embodiment according to above, here arrows are intended to illustrated the polarizations of the light. Thus coming from the left in FIG. 11*a* is light having an initial polarization P1. This polarization could be provided at the light emitting source 2. Light enters the two light permeable tubes and propagates through the tubes. A polarization means 112, such as a polarization filter, is provided at some location along each of the light permeable tubes. To obtain a clearer picture is the polarization means 112 symbolized as a dashed line in FIG. 11*a*. After having passed through the polarization means the light will have a second polarization, here illustrated by an arrow and P2. It should be noted that the polarization means could be provided at the location for the light detecting device 3. The light should however have a different polarization from the initial polarization when detected.

Figure 10:
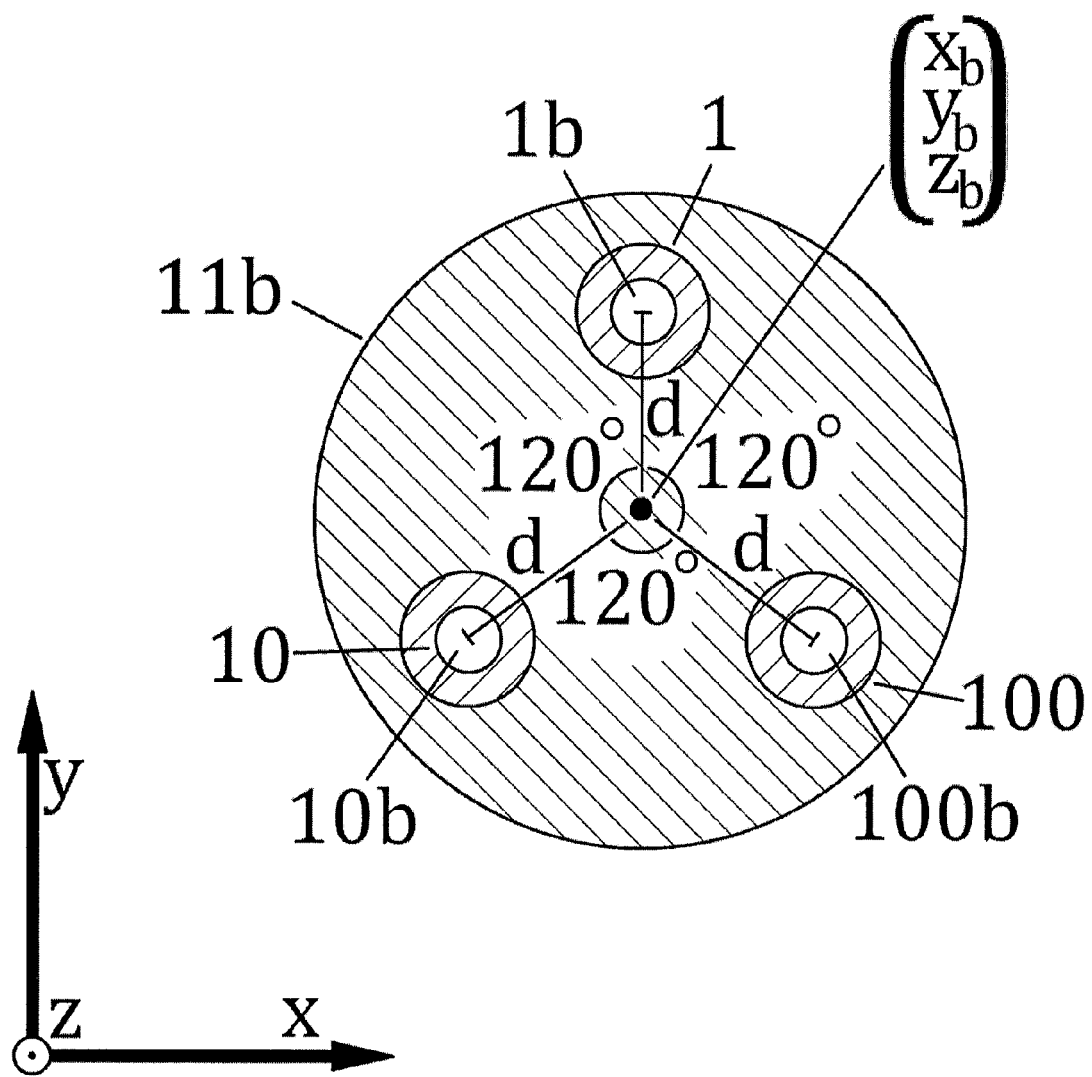
FIG. 10 illustrates, in cross section, a possible geometry that can be used to extract information about the positions of the frame portions, three tubes are illustrated.
Figure 11B:
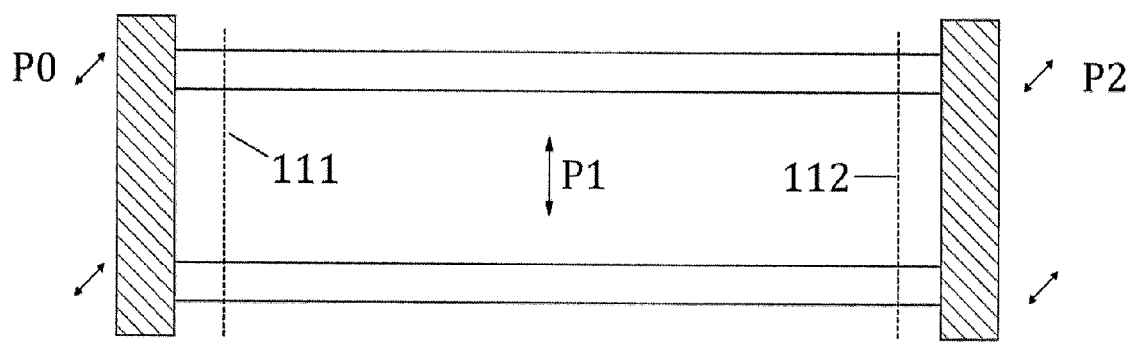

In FIG. 11*b*, there is illustrated another exemplary embodiment of a sensor provided with first 111 and second 112 polarization means, symbolized with dashed lines. As was the case with FIG. 10*a* are the arrows intended to symbolize the polarization. In FIG. 10*b* is light arriving from the light emitting source from the left. The light possesses an initial polarization P0 or might be un-polarized. At the first light polarization means 111, which is provided for each single light permeable tube 1, 10 in the sensor, will the light polarization change from P0 to P1. Light will continue to propagate through the light permeable tubes 1 and 10 with this particular polarization. Somewhere along the light permeable tubes is a second polarization means 112 provided for each light permeable tube 1, 10. This second polarization means 112, which could be a polarization filter, acts as to change the light polarization from P1 to P2. The polarization P2 is thus the polarization the light possesses when entering the light detecting device 3 (not shown in the drawing). The first polarization means 111 could be provided at the inlet of each single light permeable tube 1, 10 or be provided somewhere along the light permeable tube in a position between the light emitting source 2 and the second polarization means 112. It could even be provided before the light enters the light permeable tubes 1, 10.

As an alternative to providing all light permeable tubes 1, 10 in a sensor with polarization means according to the embodiments describe in relation to FIGS. 11*a* and 11*b*, it is instead possible to provide a sub-portion of the light permeable tubes with such means. One could for example provide a single light permeable tube with these means and use the results from the light detecting device 2 for this particular tube to provide information about twists or, correspondingly, applied torques. The end result will however be more accurate if a larger number of the light permeable tubes are provided with these means.

In an exemplary version of a sensor provided with polarization means as described above, the sensor could comprise, or be connectable to, a regulating means 113 that is configured to activate the first polarization means 111 and the second polarization means 112 according to a predetermined pattern. By providing the sensor with this functionality one obtains a sensor that could provide a way for enabling a positioning of a flexible element such as a robotic limb without utilizing the polarization feature and then activate the polarization feature to obtain a measure of the twist of the light permeable tubes or, equivalently, the applied torque.

Another exemplary embodiment that make use of the polarization of light to determine the twist and corresponding applied torque is a sensor with light permeable tubes where each light permeable tube, or at least a subgroup of the light permeable tubes within a sensor is provided with a liquid crystal device 115 that is connectable to a voltage source and arranged between the first polarization means 111 and the second polarization means 112. The liquid crystal device 115 might be a suitable liquid crystal embedded within a light permeable covering layer.

The functionality of the liquid crystal device resides in the fact that when a twist of the light permeable tubes is present will the emitted light mainly be attenuated by two factors; the attenuation from the bend of the tube and by the filtering effect of the polarizing means. By adding a liquid crystal device 115 between the polarizing means 111 and 112 in a light permeable tube it is possible to determine the angle of the twist by varying the voltage applied to the liquid crystal device to find a maximal intensity. The maximal intensity is found where the attenuation of the polarizing means is minimized i.e. the polarization rotation from the liquid crystal device minimizes the filtering effect of the polarizing mean 112 by rotating the polarization of the light to coincide with the polarization characteristics of polarizing means 112. By measuring the magnitude of the applied voltage the polarization rotation can be determined by finding the polarization rotation in a plot over polarization rotations to voltage applied of the specific liquid crystal device 115. The advantage of using the liquid crystal device in a light permeable tube 1, 10 together with polarizing means 111 and 112 is that it enables the possibility to recognize what amount of a detected intensity change results from a change in twist and a change in bend. The liquid crystal device also widens the amount of twist that is possible to unambiguously detect past 45 degrees as the span widens with the polarization rotation span of the liquid crystal device.

This functionality can be obtained by means of a sensor where at least one of the light permeable tubes comprises a liquid crystal device 115 connectable to a variable voltage source. The liquid crystal device is arranged between the first polarization means 111 and the second polarization means 112. The first polarization means could in this regard be polarization means provided by the light emitting source 2. It could however also be placed between the first polarization means 111 and the second polarization means 112 as they were described in the embodiment related to FIG. 11*b*.

Any of the sensor embodiments as described above could have light permeable tubes 1, 10 that are rotatable attached to said frame portions 11*a*, 11*b*. The sensor could also be provided with further stabilizing frames 12 arranged along the light permeable tubes 1, 10. These stabilizing frames will ascertain that the sensor is robust and suitable for use as a robotic arm. These stabilizing frames 12 could moreover be provided in a way that makes them movable along said light permeable tubes 1, 10. One possible way to achieve this is to provide them with threads where the outside of the light permeable tubes are provided with cooperating grooves.

After having described a number of detailed embodiments of the sensor and the method for enabling the positioning of a flexible element, below will be provided an example of how a robot having a robotic limb with a sensor according to any of the earlier described embodiments might be positioned and steered by means of the method and the sensor according to the proposed technology.

Example

In the example that follows below, the robot comprises a robotic limb comprising a sensor according to the earlier described embodiments. The robot also comprises a motor and an attached motor controller fastened to the floor in such a way that the motors cylindrical rotor is horizontally aligned along its symmetry axis. The robotic limb, with a setup according to FIG. 9 and FIG. 10, is attached to the rotor at frame 11a in such a way that the central endpoint of the rotor coincides with reference point A and the symmetry axis of the rotor runs in the plane $S_a$. The reference point A is defined as the mean value of the points Pa of the light permeable tubes 1, 10, 100 of the robotic limb. A weight is attached to frame 11b such that the center of mass of the weight always coincides with point B which is computed as the mean value of the points Pb of the light permeable tubes 1, 10, 100. The motor controller can turn the rotor both clockwise and anti-clockwise where a clockwise rotation lifts point B and an anti-clockwise rotation lowers point B. The purpose of the robot is to lift the weight to a point where the weight's center of mass is at a specific height H from an initial lower position. This task is performed by using negative feedback regulation.

The method will comprise the following steps:

i. noting S0 the position of the robots reference point A, A is here the initial vector;
ii. emitting S1 light through a first end of each of the light permeable tubes;
iii. detecting S2 the light having propagated through the light permeable tubes at a specific light detecting position of the light permeable tubes;
iv. processing S3 characteristics, such as intensity, of the light detected at the specific light detecting positions for each of the light permeable tubes to determine the bend of each of said light permeable tubes;
v. computing S4 the vector V from A to B;
vi. creating S5 the vector R as a summation of V and A;
vii. extracting S6 the vertical component Z from the created vector R;
viii. commanding S7 the motor controller to turn the rotor clockwise if Z is smaller than H and anti-clockwise if Z is larger than H;
ix. repeat S8 from step S1.

In this way the method and the sensor according to the present disclosure has been utilized to enable a positioning of the robot limb and a corresponding regulation of its position which in turn allowed the robot to perform a rather advanced task. The method and the sensor according to the present disclosure will however allow for the regulation of far more complex tasks. Since an exact steering of a robot and its corresponding robotic limbs demands a precise positioning of the robotic limbs, the method and sensor according to the present disclosure will provide an efficient way to enable an exact steering by means of providing an accurate positioning of the robotic limbs.

Due to the proposed technology it will thus become possible to use light-weighted robotic limbs which are less power consuming than their heavier counter-parts while at the same time obtain accurate positioning of the flexible elements that constitute the robotic limbs.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

Ref 1: K. Xu, N. Simaan, "An Investigation of the Intrinsic Force Sensing Capabilities of Continuum Robots", IEEE Transaction on Robotics, Vol 23, pp. 576-587
Ref 2: E. J. Lobaton, J. Fu, L. G. Torres, R. Alterovitz, "Continuous Shape Estimation of Continuum Robots Using X-ray Images"
Ref 3: J. M. Croom, D. C. Rucker, J. M. Romano, R. J. Webster III, "Visual Sensing of Continuum Robot Shape Using Self-Organizing Maps", IEEE International Conference on Robotics and Automation, 2010
Ref 4: G. Chen, M. T. Pham, T. Redarce, "Sensor-based guidance control of a continuum robot for a semi-autonomous colonoscopy", Robotics and Autonomus Systems, Vol 57, pp. 712-722
Ref 5: US2006045408A1, Jones et al
Ref 6: Kesner, Gavalis et al, "Multifiber optical bend sensor to aid colonoscope navigation", Optical Engineering 50(12), 124402, December 2011.

Appendix

Section 1

Below is given a slightly more mathematical exposure of the principle behind the proposed technology. To facilitate the understanding a particular example is provided that is intended to provide the reader with an understanding of the principles.

In this example one light emitting source, henceforth called emitter, such as a LED, is arranged in a way that will allow it to emit light through a light permeable tube. A light detector, henceforth called detector, is in turn arranged in a way that allows it to detect the light intensity in the tube at some other position of the light permeable tube. Below this position is chosen at the opposite end of the light permeable tube from where the emitter is provided. Two reference points, Pa and Pb, are located on the neutral axis N, see e.g. FIG. 5, 6 or 8, of the tube at different positions where $P_a$ is closer to the emitter and $P_b$ is closer to the detector. Two planes, $S_a$ and $S_b$, is defined by the tangent of the tubes neutral axis in position $P_a$ and $P_b$ respectively. The intensity of the light shining through $S_a$ and $S_b$ in the orientation from the emitter to the detector is called $I_a$ and $I_b$. $I_a$ and $I_b$ can be described by the following relations:

$$I_a = \alpha_e I_e \quad (eq.\ 1a)$$

$$I_b = \alpha_t I_a \quad (eq.\ 1b)$$

$$I_d = \alpha_d I_b \quad (eq.\ 1c)$$

$I_e$ in the equations above is the intensity of the light released by the emitter and $I_d$ is the light intensity measured by the detector. The symbols $\alpha_e$, $\alpha_t$ and $\alpha_d$ is the light attenuation in the tube from the emitter to $S_a$, from $S_a$ to $S_b$ and from $S_b$ to the detector correspondingly. The attenuation from $S_a$ to $S_b$ is therefore given by equation 2.

$$\alpha_t = I_d / (\alpha_e \alpha_d I_e) \quad (eq.\ 2)$$

Other combinations of equation 1a-1c can derive $\alpha_t$, such as the relation below:

$$\alpha_t = I_b / I_a \quad (eq.\ 3)$$

The tube is processed, through coatings or other means, so that light shining through $S_a$ with intensity $I_a$ can be detected by a detector at position $P_b$ with the same intensity for a constant level of bend of the tube, between $S_a$ and $S_b$, from the tangent of the neutral axis in point $P_a$ or $P_b$, regardless of the direction of the bend relative to the tubes neutral axis. The relation between at and the bend of the tube between $S_a$ and $S_b$ is specific to the processing technique and material of the tube's inside and can be tested experimentally or derived analytically if enough material specifications is given.

Figure 8:
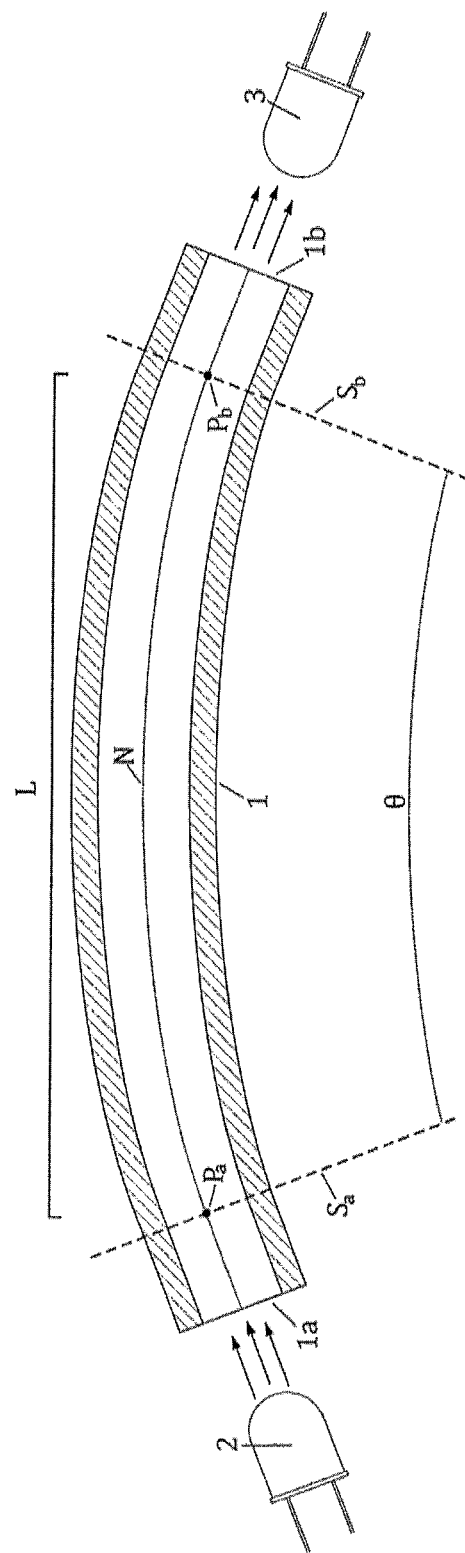
FIG. 8 shows an exemplary embodiment of a sensor according to the present disclosure, a single tube of the sensor is shown in a bent configuration.

The tube will attenuate light so that the curvature θ of the bend of the tube between $S_a$ and $S_b$, measured in radians, see FIG. 8, can be related to the attenuation $α_t$ for predetermined values of the other attenuations and material specifications in the sensor. The curvature of the bend can be related to the absolute length L between $P_a$ and $P_b$. If a constant curvature assumption is used L can explicitly be given by equation 4 where $L_0$ indicates the length between $P_a$ and $P_b$ when the tube is not bent.

$$L = (2L_0/\theta)\sin(\theta/2) \qquad (4)$$

If no constant curvature assumption is used the relation between L and θ can be determined experimentally. θ can also be related to the magnitude of a resultant force acting on the tube, creating the bend, when the acting point is in either $S_a$ or $S_b$. The relation between θ and the forces magnitude can also be determined experimentally.

If both the emitter and the detector are linearly polarized and if the emitter can rotate around the neutral axis of the tube relative to the detector, the angle of rotation between the emitter and detector can be calculated. By Malus's law the intensity of light detected by the detector will be:

$$I_d = \alpha_e \alpha_t \alpha_d I_e \cos^2(\phi),$$

where ϕ is the angle between the polarizing axis of the emitter and the polarizing axis of the detector and $I_e$ is the absolute intensity of the polarized light of the emitter. The angle ϕ is thus given by the relation:

$$\varphi = 0.5 \arccos\left(\frac{2I_D - 1}{\alpha_e \alpha_t \alpha_d I_e}\right)$$

To make the emitter linearly polarized a polarizing film can be placed between the emitter and detector statically aligning it with the emitter around the tube's neutral axis. By analogue, the detector can be made linearly polarized by putting a polarizing film between the emitter and detector statically aligning it with the detector around the tube's neutral axis.

Section 2

Below is given a more detailed description of exemplary algorithms for positioning of a flexible element, such as a robotic limb, based on the methods and sensors described earlier. These are exemplary algorithms that are given to enable the skilled artisan to utilize the sensors. Other specific mathematical algorithms are however foreseeable and as such they can also be implemented to provide for a representation of the position of a robotic limb.

2D Positioning Algorithm

Figure 7:
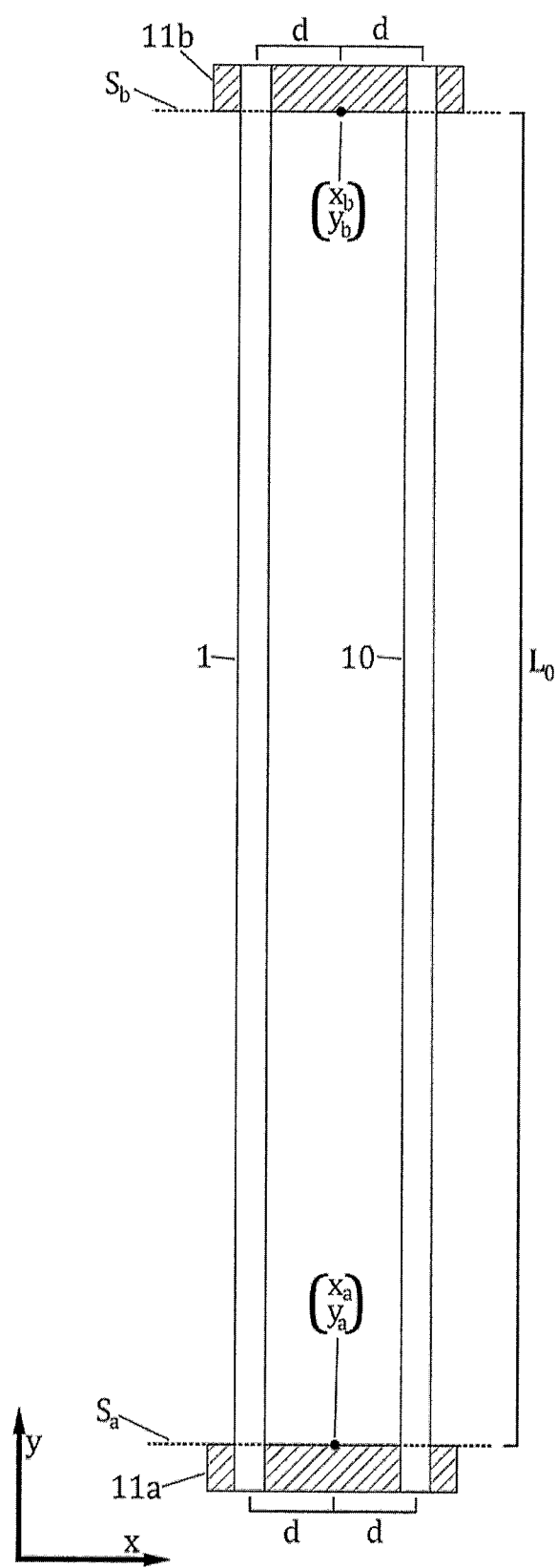
FIG. 7 shows an alternative exemplary embodiment of a sensor according to the present disclosure, a single tube of the sensor is shown with coordinates indicated for the frame portions.

The give the simplest possible setup the proposed method relates to a sensor that comprises two tubes of equal length whose ends are attached to two solid frames. See e.g. FIG. 4*a*. The fastening points in each frame are at equal length d from each frame's center. It is assumed that the frame por1*a* is fixed in space with the frame lengthwise running parallel to the x axis, see FIG. 7. All bending motion will occur in the x-y plane by applying a force on the frame portion 11*b*. For this setup (see e.g. FIG. 8 for the bend of a single tube) the exemplary algorithm used for 2D positioning of a flexible element can be divided into the following steps:

1. Determine the distance d from the center of the frame to each tube's neutral axis intersecting the plane of the frame, and measure the tube's initial length $L_0$.
2. Activate the light emitting sources.
3. Determine the light intensity I for each level of bend θ for each tube.
4. Measure the light intensity I for each tube: ($I_1$, $I_2$)
5. Determine the level of bend θ for each tube from the intensities in step 3: ($\theta_1$, $\theta_2$)
6. Calculate the lengths ($l_1$, $l_2$) from the bends in step 4 and the tube's initial length $L_0$ as:

$$l_i = \frac{2L_0}{\theta_i}\sin\left(\frac{\theta_i}{2}\right)$$

7. Create the tuple q=($l_1$, $l_2$, d) and calculate $$\kappa(q) = \frac{l_1 - l_2}{d(l_1 + l_2)}$$

$$l(q) = \frac{2d(l_1 + l_2)}{l_1 - l_2}\sin^{-1}\left(\frac{l_1^2 - l_2^2}{4d(l_1 + l_2)}\right)$$

$$\vec{r}(q) = \begin{pmatrix} \frac{1}{\kappa(q)}(1 - \cos(\kappa(q)l(q))) \\ \frac{1}{\kappa(q)}\sin(\kappa(q)l(q)) \end{pmatrix}$$

8. Calculate the vector from the reference point $$\begin{pmatrix} x_a \\ y_a \end{pmatrix}$$

of the frame portion 11*a* to the other as $$\begin{pmatrix} x_b \\ y_b \end{pmatrix} = \begin{pmatrix} x_a \\ y_a \end{pmatrix} + \vec{r}(q),$$

where $$\begin{pmatrix} x_a \\ y_a \end{pmatrix}$$

is the center of the bottom frame and $$\begin{pmatrix} x_b \\ y_b \end{pmatrix}$$

is the resultant vector from the origin to the reference point in the frame portion 11*b*.

To continually perform the 2D positioning steps 4-8 can be iterated after a first full run.

3D Positioning Algorithm

The simplest setup for 3D positioning utilizes a sensor that comprises three tubes of equal length whose ends are attached to two solid frames. The fastening points in each frame are at equal length from the frames center. The three fastening points are angularly fixed to be equal between the tubes and the frames center. The frame portion 11a will be considered fixed in space parallel to the x-y plane. All bending motion results from the application of a force on frame portion 11b. For this particular setup (see e.g. FIG. 3b) the algorithm used for 3D positioning of the flexible element can be divided into the following steps:

1. Determine the distance d from the center of the frame to each tube's center, in the plane of the frame, and measure the tube's initial length $L_0$.
2. Activate the light emitting sources.
3. Determine the light intensity I for each level of bend $\theta$ for each tube.
4. Measure the light intensity I for each tube: $(i_1, i_2, i_3)$
5. Determine the level of bend $\theta$ for each tube from the intensities in step 3: $(\theta_1, \theta_2, \theta_3)$
6. Calculate the lengths $(l_1, l_2, l_3)$ from the bends in step 4 and the tube's initial length $L_0$ as:

$$l_i = \frac{2L_0}{\theta_i} \sin\left(\frac{\theta_i}{2}\right)$$

7. Create the tuple $q=(l_1, l_2, l_3, d)$ and calculate $$\Phi(q) = \tan^{-1}\left(\frac{l_2 + l_3 - 2l_1}{\sqrt{3}(l_2 - l_3)}\right)$$

$$\kappa(q) = \frac{2\sqrt{l_1^2 + l_2^2 + l_3^2 - l_1 l_2 - l_1 l_3 - l_2 l_3}}{d(l_1 + l_2 + l_3)}$$

$$l(q) = \frac{d(l_1 + l_2 + l_3)}{2\sqrt{l_1^2 + l_2^2 + l_3^2 - l_1 l_2 - l_1 l_3 - l_2 l_3}} \sin^{-1}\left(\frac{\sqrt{l_1^2 + l_2^2 + l_3^2 - l_1 l_2 - l_1 l_3 - l_2 l_3}}{3d}\right)$$

$$\vec{r}(q) = \begin{pmatrix} \frac{1}{\kappa(q)}(1 - \cos(\kappa(q)l(q)))\cos(\Phi(q)) \\ \frac{1}{\kappa(q)}(1 - \cos(\kappa(q)l(q)))\sin(\Phi(q)) \\ \frac{1}{\kappa(q)}\sin(\kappa(q)l(q)) \end{pmatrix}$$

8. Calculate the vector from the center of the first frame to the other as $$\begin{pmatrix} x_b \\ y_b \\ y_b \end{pmatrix} = \begin{pmatrix} x_a \\ y_a \\ z_a \end{pmatrix} + \vec{r}(q),$$

where $$\begin{pmatrix} x_a \\ y_a \\ z_a \end{pmatrix}$$

is the center of frame portion 11a and $$\begin{pmatrix} x_b \\ y_b \\ y_b \end{pmatrix}$$

is the resultant vector from the origin to the reference point in frame portion 11b.

To continually perform the 3D positioning steps 4-8 can be iterated after a first full run.

The invention claimed is:

1. A method for enabling the positioning of a flexible element comprising a sensor having at least two spatially separated light permeable tubes (1, 10) provided with first end portions (1a) and second end portions (1b) attached to corresponding first and second frame portions (11a, 11b), wherein the method comprises the steps of:
    emitting (S1) light through a first end of each of said at least two light permeable tubes;
    detecting (S2) light having propagated through said light permeable tubes at a specific light detecting position for each of said at least two light permeable tubes;
    processing (S3) characteristics of the light detected at the specific light detecting positions for each of said light permeable tubes to determine the bend of each of said light permeable tubes.

2. The method according to claim 1, wherein the step of processing (S3) further comprises the step of:
    determining (S31) the length between two reference points (Pa, Pb) along each of the said at least one light permeable tubes based on the determined bend of each of said light permeable tubes.

3. The method according to claim 2, further comprising the step of:
    computing (S32), based on said determined lengths for each of said at least two light permeable tubes, a resulting vector corresponding to a vector directed from the frame portion (11a) to the frame portion (11b).

4. The method according to claim 1, wherein the number of light permeable tubes is two and wherein the computed resultant vector provides a two-dimensional representation of the position of said frame portions relative each other.

5. The method according to claim 3, wherein the number of light permeable tubes is three and wherein the computed resultant vector provides a three-dimensional representation of the position of said frame portions relative each other.

6. The method according to claim 5, wherein the step of computing (S32) further comprises the step of trilateration (S321) of said determined lengths to obtain a three dimensional vector corresponding to a vector directed from the first frame portion (11a) to the second frame portion (11b) to thereby provide a three-dimensional representation of the position of the frame portions relative each other.

7. The method according to claim 1, wherein the step of processing (S3) characteristics of the detected light comprises processing the intensity of the detected light to thereby determine the bend of each of said at least two light permeable tubes.

8. A sensor for enabling positioning of a flexible element subject to applied forces, wherein said sensor comprises:
    at least two spatially separated light permeable tubes (1, 10) each having a first end (1a, 10a) arranged on a first frame portion (11a) and a second end (1b, 10b) arranged on a second frame portion (11b) of said flexible element, and wherein each of said at least two spatially separated light permeable tubes comprises, a light detecting device (3), connectable to a processing unit (4), and arranged at a light detecting position of each of said light permeable tubes and configured to detect light emitted from a light emitting source (2) through each of said at least two light permeable tubes (1, 10) and configured to transfer information comprising information relating to said detected light to said processing unit (4) to enable said processing unit to determine the bend of said light permeable tubes (1, 10).

9. The sensor according to claim 8, comprising a processing unit (4) connected to said light detecting device (3) and configured to receive information comprising information relating to said characteristics of said detected light and configured to determine a degree of bending for each of said at least two light permeable tubes (1, 10) based on the received information.

10. The sensor according to claim 9, wherein the processing unit (4) further comprises:
a determining unit (41) configured to determine the length between two reference points along each of the said at least two light permeable tubes based on the determined bend of each of said light permeable tubes.

11. The sensor according to claim 10, wherein the processing unit further comprises:
a computing unit (42), configured to compute, based on said determined lengths for each of said at least two light permeable tubes, a resulting vector corresponding to a vector directed from the frame portion (11a) to the frame portion (11b).

12. The sensor according to claim 8, comprising two light permeable tubes, wherein the computing unit is configured to compute a resultant vector to thereby provide a two-dimensional representation of the positions of said frame portions (11a, 11b) relative each other.

13. The sensor according to claim 11, comprising three light permeable tubes and wherein the computed resultant vector provides a three-dimensional representation of the positions of said frame portions.

14. The sensor according to claim 13, wherein the computing unit (42) is configured to perform trilateration of said determined lengths to obtain a three dimensional vector corresponding to a vector directed from the first frame portion (11a) to the second frame portion (11b) to thereby provide a three-dimensional representation of the positions of the frame portions relative each other.

15. The sensor according to claim 8, wherein the processing unit (4) is configured to determine the bend of each of said light permeable tubes based on the intensity of the detected light.

16. The sensor according to claim 8, wherein the inside of said light permeable tubes is prepared to reduce direct reflection and maintain the light polarization.

17. The sensor according to claim 8, wherein the light permeable tube is constructed from a light weight material such as carbon fiber.

18. The sensor according to claim 8, wherein the material of at least one of the light permeable tubes (1, 10) is electrically conducting or provided with electrically conducting means to enable the light permeable tube to conduct an electrical current between at least part of the distance between said end points (1a, 1b) on said tube (1, 10).

19. The sensor according to claim 8, wherein at least one of the light permeable tubes comprises means (112) for giving light a second polarization, different from the first polarization of the emitted light, where said means (112) are arranged in said at least one light permeable tube (1, 10) in a position between the light emitting source (2) and the light detecting position or at the light detection position.

20. The sensor according to claim 8, wherein at least one of the light permeable tubes comprises first polarization means (111) for giving light a first polarization, said means being arranged after the light emitting source (2) in proximity to the first end portion (1a) of said at least one light permeable tube (1, 10), and second polarization means (112) for giving light a second polarization, different from the first polarization, where said second polarization means (112) are arranged closer to the light detecting position than is the first polarization means (111).

21. The sensor according to claim 9, wherein said second polarization means (112) are arranged at the light detection position and is comprised in the light detecting device (3).

22. The sensor according to claim 9, wherein the first polarization means (111) is configured to provide linearly polarized light, and wherein the second polarization means (112) is configured to provide a 45 degree polarization of the light relative said first polarization.

23. The sensor according to claim 10, wherein the sensor comprises, or is connectable to, a regulating means (113) configured to activate the first means (111) and the second means (112) according to a predetermined pattern.

24. The sensor according to claim 10, wherein at least one of the light permeable tubes further comprises a liquid crystal device (115) connected to a variable voltage source (116), said liquid crystal device being arranged between said first means (111) and said second means (112).

25. The sensor according to claim 8, wherein said light permeable tubes (1, 10, 100) are rotatable attached to said frame portions (11a, 11b).

26. The sensor according to claim 8, wherein said sensor comprises further stabilizing frames (12) arranged along the light permeable tubes (1, 10).

27. The sensor according to claim 26, wherein said stabilizing frames (12) are movably arranged along said light permeable tubes (1, 10).

28. The sensor according to claim 8, wherein the flexible element is a robotic limb.

29. The sensor according to claim 8, wherein each of said light permeable tubes (1, 10) are provided with a light emitting source (2) arranged at a light emitting position of said light permeable tubes (1,10).

30. A robot comprising a robotic limb and a sensor for enabling positioning of a flexible element subject to applied forces, wherein said sensor comprises:
at least two spatially separated light permeable tubes (1, 10) each having a first end (1a, 10a) arranged on a first frame portion (11a) and a second end (1b, 10b) arranged on a second frame portion (11b) of said flexible element, and wherein each of said at least two spatially separated light permeable tubes comprises,
a light detecting device (3), connectable to a processing unit (4), and arranged at a light detecting position of each of said light permeable tubes and configured to detect light emitted from a light emitting source (2) through each of said at least two light permeable tubes (1, 10) and configured to transfer information comprising information relating to said detected light to said processing unit (4) to enable said processing unit to determine the bend of said light permeable tubes (1, 10).

* * * * *